(12) United States Patent
Han

(10) Patent No.: US 9,557,622 B2
(45) Date of Patent: Jan. 31, 2017

(54) ELECTROCHROMIC DISPLAY DEVICE, AND METHOD FOR MANUFACTURING SAME

(71) Applicant: LG INNOTEK CO., LTD., Seoul (KR)

(72) Inventor: Jung Hyuck Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/652,695

(22) PCT Filed: Dec. 9, 2013

(86) PCT No.: PCT/KR2013/011335
§ 371 (c)(1),
(2) Date: Jun. 16, 2015

(87) PCT Pub. No.: WO2014/098397
PCT Pub. Date: Jun. 26, 2014

(65) Prior Publication Data
US 2015/0323849 A1    Nov. 12, 2015

(30) Foreign Application Priority Data
Dec. 17, 2012 (KR) .................. 10-2012-0147069

(51) Int. Cl.
*G02F 1/153* (2006.01)
*G02F 1/15* (2006.01)
*G02F 1/155* (2006.01)

(52) U.S. Cl.
CPC ............... *G02F 1/1525* (2013.01); *G02F 1/15* (2013.01); *G02F 1/155* (2013.01); *G02F 2001/1515* (2013.01)

(58) Field of Classification Search
CPC .......... G02F 1/15; G02F 1/1525; G02F 1/155; G02F 1/1515
(Continued)

(56) References Cited

U.S. PATENT DOCUMENTS 5,668,663 A * 9/1997 Varaprasad ............. B32B 17/06
359/265
7,999,992 B2 * 8/2011 Mazurkiewicz ...... G02F 1/1525
359/273
(Continued)

FOREIGN PATENT DOCUMENTS

JP     2003-147342 A    5/2003
KR  10-2006-0092362 A    8/2006
(Continued)

OTHER PUBLICATIONS

International Search Report dated Apr. 4, 2014 issued in Application No. PCT/KR2013/011335 with English translation).

*Primary Examiner* — Tuyen Tra
(74) *Attorney, Agent, or Firm* — KED & Associates, LLP

(57) ABSTRACT

Provided are an electrochromic display device and a method of manufacturing the electrochromic display device, the electrochromic display device, including: a first substrate and a second substrate facing each other; an electrochromic layer interposed between the first substrate and the second substrate; and a sealing part provided in a continuous ring-like shape on the first substrate or the second substrate and intended for sealing the electrochromic layer. Thus, production efficiency can be increased, and production costs can be reduced.

11 Claims, 9 Drawing Sheets

(58) Field of Classification Search
USPC .................. 359/265–275; 345/105; 362/494
See application file for complete search history.

(56) References Cited

U.S. PATENT DOCUMENTS

| | | | | |
|---|---|---|---|---|
| 8,537,451 | B2* | 9/2013 | Mazurkiewicz | .......... G02F 1/15 |
| | | | | 359/273 |
| 8,988,756 | B2* | 3/2015 | Agrawal | ................ G02F 1/161 |
| | | | | 359/267 |
| 2006/0132885 | A1 | 6/2006 | Pichot et al. | |

FOREIGN PATENT DOCUMENTS

| KR | 10-2008-0051280 A | 6/2008 |
|---|---|---|
| KR | 10-2009-0037063 A | 4/2009 |
| KR | 10-1127277 B1 | 3/2012 |
| KR | 10-1435196 B1 | 8/2014 |

\* cited by examiner

ELECTROCHROMIC DISPLAY DEVICE, AND METHOD FOR MANUFACTURING SAME

CROSS-REFERENCE TO RELATED PATENT APPLICATIONS

This application is a U.S. National Stage Application under 35 U.S.C. §371 of PCT Application No. PCT/KR2013/011335, filed Dec. 9, 2013, which claims priority to Korean Patent Application No. 10-2012-0147069, filed Dec. 17, 2012, whose entire disclosures are hereby incorporated by reference.

TECHNICAL FIELD

The present invention relates to an electrochromic display, and more particularly, to an electrochromic display device and a method of manufacturing the electrochromic display device, which can improve production efficiency by forming the electrochromic display device by dropping a liquid electrolyte or electrochromic material, and which can cause uniform discoloration and decolorization using an electrochromic coating layer coated with an electrochromic material.

BACKGROUND ART

Electrochromism is a phenomenon in which a color is reversibly changed by the direction of an electric field when a voltage is applied. An electrochromic material is a material, an optical property of which can be reversibly changed by an electrochemical redox reaction having the electrochromism property. The electrochromic material is not colored when an electrical signal is not applied from the outside, but it is colored when the electrical signal is applied. On the contrary to this, when the electrical signal is not applied from the outside, the electrochromic material is colored, but when the electrical signal is applied, the electrochromic material is not colored.

An electrochromic device, which is a device using a phenomenon in which the light transmission of an electrochromic material is changed by an electrochemical redox reaction, has been used for adjusting the light transmission or reflectance of a window glass for building or a mirror for automobiles. Recently, as the electrochromic device has been known to have an infrared cutoff effect as well as a color variation in a visible ray area, it has been receiving a great deal of attention with regard to the possibility of application as an energy-saving type product.

In particular, when the electrochromic device is applied to a rear view mirror, a vehicle window, a sun roof, and the like, it functions to stably protect a driver's field of vision by providing a variation in reflectance depending upon discoloration of the mirror at the same time as automatically sensing the strong beam of a car reflected from a car mirror in the daytime or at night.

FIG. 1 is a view schematically illustrating the structure of a conventional electrochromic display device.

Referring to FIG. 1, the conventional electrochromic display device is configured such that a first transparent substrate 10 and a second transparent substrate 20 facing each other are disposed to be spaced apart from each other; an electrode 30 and a reflection layer 40 are formed on respect facing surfaces of the first and second transparent 10, 20; a space is formed between the electrode 30 and the reflection layer 40 using a sealant 50; an electrochromic material layer 60 is formed by injecting a liquid discoloration material and an electrolyte into the formed space; and electrode connection parts 70, 80 are formed at one end of the first transparent substrate 10 and the transparent electrode 30, and at one end of the second transparent substrate and the reflection layer 40. The conventional electrochromic display device functions to protect a driver's field of vision by applying an electrochromic material in a liquid state to reduce the reflectance of light.

FIG. 2 illustrates a formation process of the electrochromic material layer of the conventional electrochromic display device.

Referring to FIG. 2, the first transparent substrate is prepared as shown in (A) of FIG. 2. More specifically, the first transparent substrate on which the transparent electrode is formed is prepared. Also, the second transparent substrate on which the reflection layer is formed may be prepared.

Then, as shown in (B) of FIG. 2, an upper portion of the transparent electrode is subjected to side sealing using the sealant 50. At this time, an injection hole 54 into which an electrochromic material and an electrolyte are injected is formed. Accordingly, the side sealing causes a spaced portion by the injection hole 54 rather than causing a continuous ring-like shape on the transparent electrode. As previously described regarding (A) of FIG. 2, when the second transparent substrate on which the reflection layer is formed is prepared, the reflection layer may be subjected to side sealing.

Then, as shown in (C) of FIG. 2, after bonding the second transparent substrate (20) on which the reflection layer is formed, and the first transparent substrate on which the transparent electrode 30 is formed, an electrochromic material and an electrolyte are injected via the injection hole 54 in a vacuum state.

After this, as shown in (D) of FIG. 2, the electrochromic material layer is formed by sealing the injection hole 54 using an end sealing 55.

As such, with regard to the conventional electrochromic device, when the electrochromic material layer is formed, external air and moisture should be blocked in order to increase the durability of an electrochromic function. To do so, by boding the first and second transparent substrates, the electrochromic material and the electrolyte should be injected in a vacuum state.

However, as the electrochromic display device has become bigger, such a vacuum injection method is problematic in that a time required for injection is largely increased so that production efficiency is reduced, and production costs is increased.

Also, in order to maintain an electrochromic state of the electrochromic material in the liquid state, a voltage should be continuously applied. Thus, it is problematic in that high power consumption is required, and a reaction speed is slow upon decolorization. Furthermore, the electrochromic material in the liquid state is problematic in that uniform discoloration is not performed upon discoloration.

DISCLOSURE OF INVENTION

Technical Problem

Accordingly, the present invention has been made keeping in mind the above problems occurring in the related art. An aspect of the present invention provides an electrochromic display device and a method of manufacturing the electrochromic display device, which can improve production efficiency of a product and can reduce production costs by using a dropping method rather than a conventional vacuum injection method, and which can cause uniform discoloration and decolorization by forming an electrochromic coating layer coated with an electrochromic material, and can implement low power consumption and a rapid reaction speed.

Solution to Problem

According to an aspect of the present invention, an electrochromic display device may include: a first substrate and a second substrate facing each other; an electrochromic layer interposed between the first substrate and the second substrate; and a sealing part provided in a continuous ring-like shape on the first substrate or the second substrate and intended for sealing the electrochromic layer.

According to one embodiment, the electrochromic display device may further include: a transparent electrode formed between the first substrate and the electrochromic layer; and a conductive reflection layer formed between the electrochromic layer and the second substrate.

According to one embodiment, the electrochromic layer may include: an electrolyte layer interposed between the transparent electrode and the conductive reflection layer; and an electrochromic coating layer provided on one surface or both surfaces of the electrolyte layer facing the transparent electrode or the conductive reflection layer.

According to one embodiment, the sealing part may be provided on a side portion of the electrochromic coating layer or at an upper portion of one end of the electrochromic coating layer.

According to one embodiment, the conductive reflection layer is composed of at least one metal selected from the group consisting of Cu, Au, Ag, Ni, Al, Cr, Ru, Re, Pb, Sn, In, and Zn, or an alloy containing these metals.

According to another aspect of the present invention, a method of manufacturing an electrochromic display device may include: dropping an electrolyte on any one substrate of a first substrate and a second substrate; coating a sealant in a continuous ring-like shape on another substrate to form a sealing part; and bonding the first substrate and the second substrate.

The method according to one embodiment may further include: forming a transparent electrode on the first substrate; and forming a conductive reflection layer on the second substrate, before the dropping the electrolyte.

The method according to one embodiment may further include dropping a liquid electrochromic material with the electrolyte upon the dropping of the electrolyte.

The method according to one embodiment may further include forming an electrochromic coating layer on the transparent electrode after the forming the transparent electrode.

The method according to one embodiment may further include forming an electrochromic coating layer on the conductive reflection layer after the forming the conductive reflection layer Advantageous Effects of Invention According to some embodiments of the present invention, as an electrochromic display device is manufactured by a dropping method rather than a vacuum injection method, production efficiency can be increased, and production costs can be reduced.

Also, since an electrochromic coating layer coated with an electrochromic material is formed, uniform discoloration and decolorization can be implemented, and since the electrochromic material is an inorganic or organic polymer, durability of the material is excellent.

Moreover, since the electrochromic material has a memory effect, a voltage is only applied upon discoloration and decolorization, so low power consumption can be realized. Also, since a counter voltage is applied upon decolorization, a rapid decolorization reaction speed can be realized.

BEST MODE FOR CARRYING OUT THE INVENTION

Figure 1:
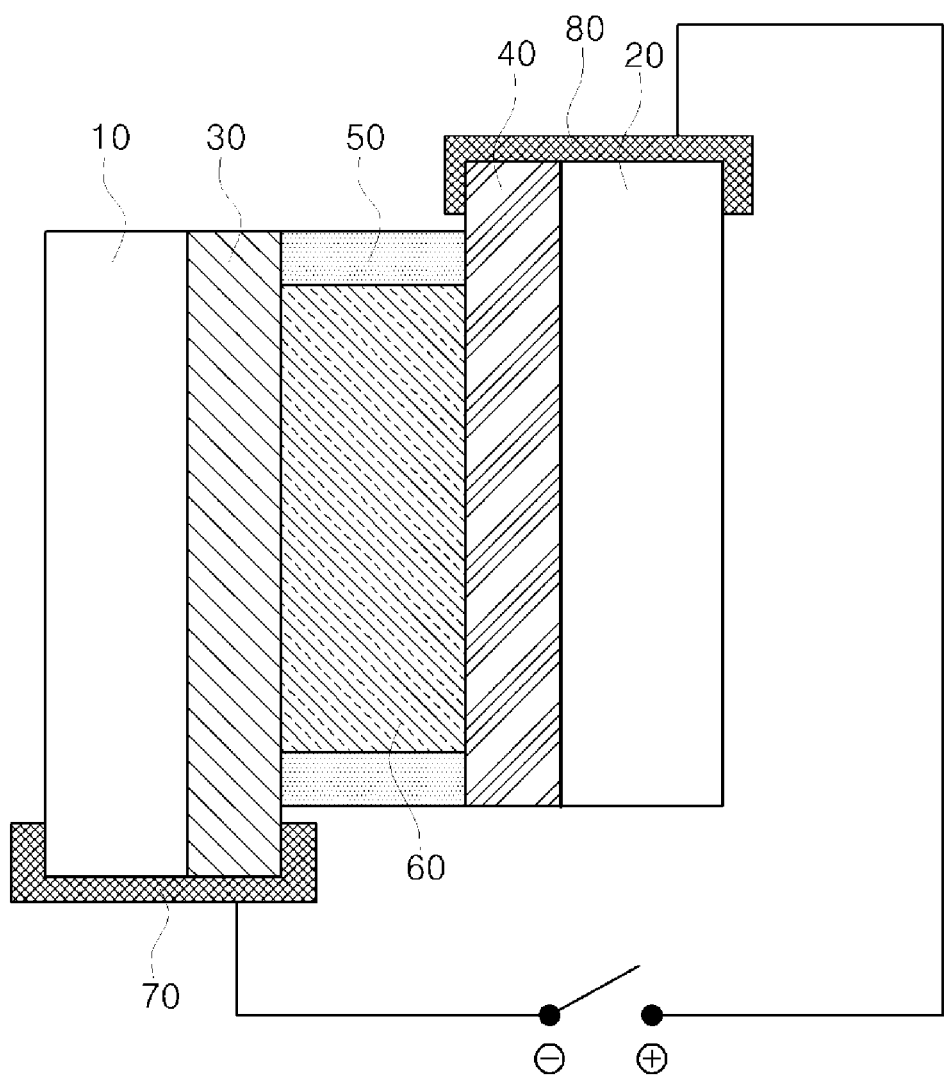
FIG. 1 is a view schematically illustrating the structure of a conventional electrochromic display device.
Figure 2:
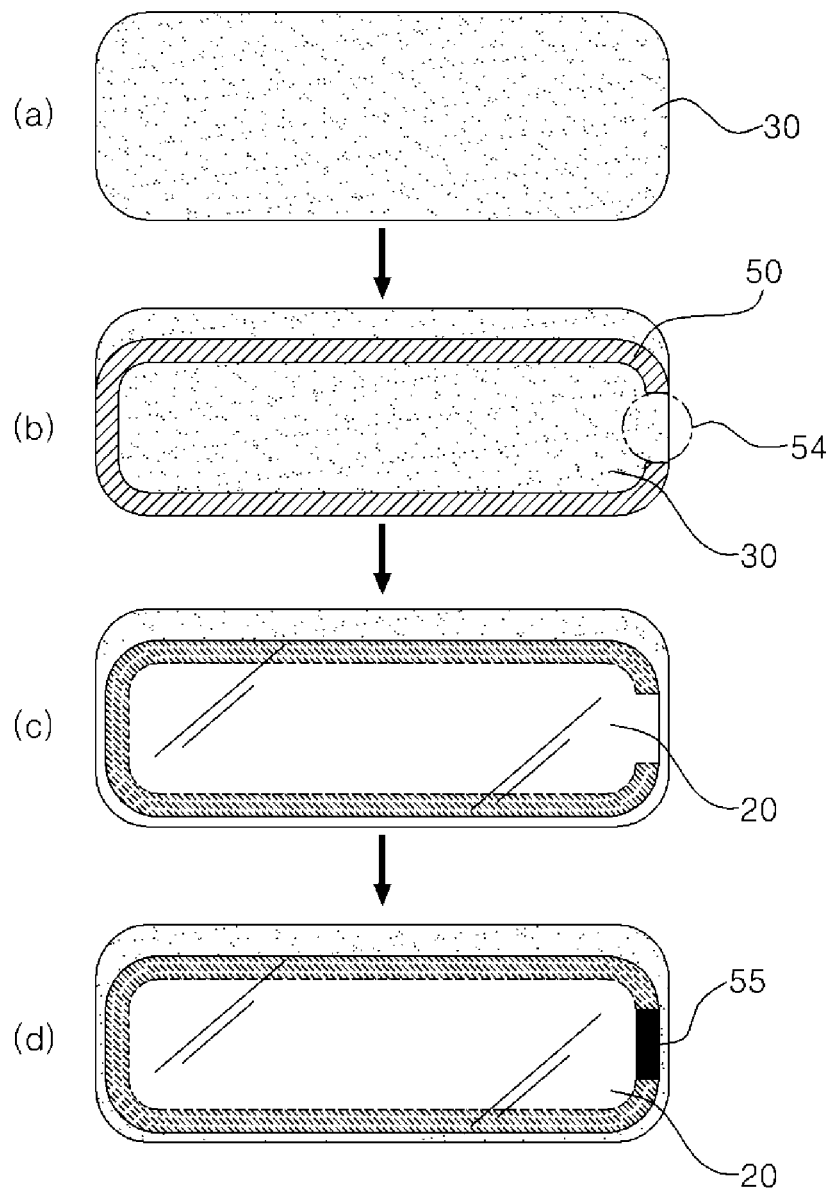
FIG. 2 illustrates a manufacturing process of the conventional electrochromic display device.

Hereinafter, preferred embodiments of the present invention, which can be easily implemented by those having ordinary skill in the art, will be described in detail with reference to the accompanying drawings. The present invention may, however, be embodied in different forms and should not be construed as limited to the embodiments set forth herein. It should be understood, however, that there is no intent to limit embodiments of the invention to the particular forms disclosed, but on the contrary, embodiments of the invention are to cover all modifications, equivalents, and alternatives falling within the scope of the invention. In the following description, it is to be noted that, when the functions of conventional elements and the detailed description of elements related with the present invention may make the gist of the present invention unclear, a detailed description of those elements will be omitted. Terms, which will be described later, are terms defined in consideration of each function in the present invention, and should be interpreted based on the contents throughout the specification. In the drawing, the same reference numerals are used throughout the different drawings to designate the same or similar components.

The present invention is intended to provide an electrochromic display device and a method of manufacturing the electrochromic display device, which can improve production efficiency and can reduce a product cost by forming the electrochromic display device using a dropping method, and which is configured such that an electrochromic coating layer resulting from coating a substrate with an electrochromic material is formed so that uniform discoloration and decolorization can be implemented, and low power consumption, and a rapid decolorization reaction speed can be realized.

FIGS. 3 to 7 are views illustrating various embodiments of a structure of an electrochromic display device according to the present invention.

Figure 3:
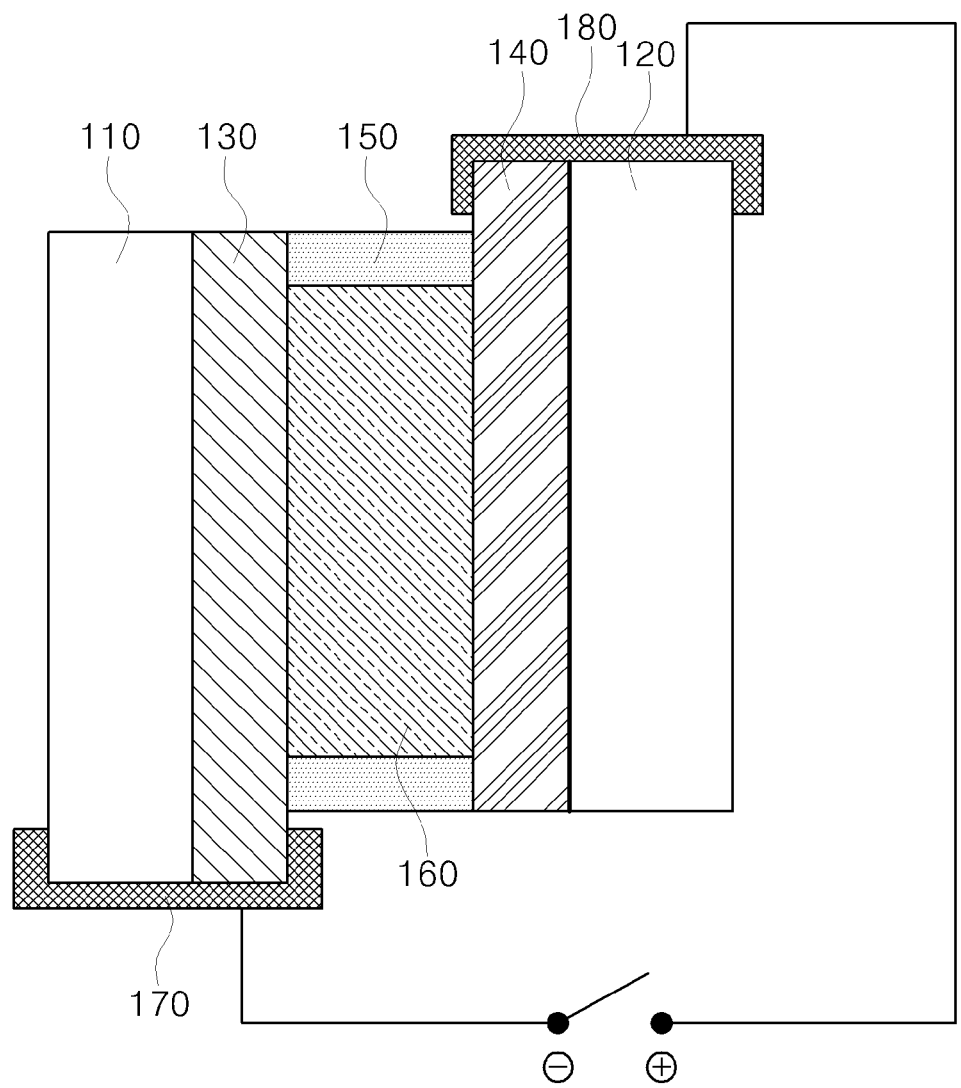
FIGS. 3 to 7 are views illustrating various embodiments of a structure of an electrochromic display device according to the present invention.

Referring to FIG. 3, an electrochromic display device according to an embodiment of the present invention may include: a first transparent substrate 110 and a second transparent substrate 120 facing each other; a transparent electrode 130 and a conductive reflection layer 140 formed on respective facing surfaces of the first and second transparent substrate 110, 120; an electrochromic layer 160 formed between the transparent electrode 130 and the conductive reflection layer 140; a sealing part 150 formed in a continuous ring-like shape and for sealing the electrochromic layer 160. Also, the electrochromic display device may include electrode connection parts 170 and 180 formed at an end of one side of the first transparent substrate 110 and the transparent electrode 130 and at an end of one side of the second transparent substrate 120 and the conductive reflection layer 140, respectively.

The first and second transparent substrates 110, 120 may be a glass substrate, but are not limited thereto. The first and second transparent substrates 110, 120 may be made of a transparent material, such as silicone, synthetic resin, aerogel, and the like.

Also, in the electrochromic display device, since only any one of the first substrate and the second substrate facing each other may be a transparent substrate, either of the first transparent substrate 110 and the second transparent substrate 120 according to the present embodiment may be replaced by a non-transparent substrate. Even in the case in which either of the first transparent substrate 110 and the second transparent substrate 120 is replaced by a non-transparent substrate, the first transparent substrate 110 and the second transparent substrate 120 may have the same function as that shown the case in which both the first transparent substrate 110 and the second transparent substrate 120 are formed transparent. Accordingly, for the convenience of description, the embodiments will be hereinafter described based on the case in which both the first transparent substrate and the second transparent substrate are transparent substrates.

The transparent electrode 130 may be deposited on the first transparent substrate 110, namely, a surface opposite to the second substrate 120 and may be any one selected from the group consisting of ITO (Indium Tin Oxide), FTO (Fluor doped Tin Oxide), AZO (Aluminum doped Zinc Oxide), GZO (Gallium doped Zinc Oxide), ATO (Antimony doped Tin Oxide), IZO (Indium doped Zinc Oxide), NTO (Niobium doped Titanium Oxide), ZnO, and a combination thereof. However, this is only one example, but is not limited thereto.

The conductive reflection layer 140 is formed on the second transparent substrate 120, and serves as a reflection plate for reflecting light entered by passing through the electrochromic layer 160, and as a counter electrode of the transparent electrode 130. The conductive reflection layer 140 may be composed of at least one metal selected from the group consisting of Cu, Au, Ag, Ni, Al, Cr, Ru, Re, Pb, Sn, In, and Zn, or an alloy including these metals. However, this is only one example, but is not limited thereto.

The electrochromic layer 160 is made of a liquid electrolyte and a liquid or solid electrochromic material, and is formed between the transparent electrode 130 and the conductive reflection layer 140, thereby causing coloration or decolorization by receiving electricity applied from the transparent electrode 130 and the conductive reflection layer 140 through an oxidation or reduction reaction.

The electrochromic layer 160 according to the present invention is formed by a dropping method which will be described later, rather than by a conventional vacuum bonding method of injecting an electrochromic material and an electrolyte into a gap between the transparent electrode and the conductive reflection layer in a vacuum state. Thus, the sealing part 150 is formed by only side sealing without end sealing, so that the sealing part 150 having a continuous ring-like shape can be formed without an injection hole required in the conventional method. Here, the continuous ring-like shape may refer to a shape in which a sealing member extending from an arbitrary starting point on the sealing part 150 to one direction without an injection hole is returned to the starting point, and may be various shapes including a straight line portion, a bent portion, a winding portion, and the like, as well as a circular doughnut-like shape.

The electrochromic material is a material having an electrochromic property in which absorbance is changed by an electrochemical redox reaction. According to whether or not a voltage is applied, and voltage intensity, an electrochemical redox phenomenon of the electrochromic material is reversibly generated, so transparency and absorbance of the electrochromic material can be reversibly changed. The electrochromic material may be a metal oxide-based electrochromic material containing tungsten, iridium, nickel, and vanadium, an organic electrochromic material containing viologen quinone, a conductive polymer-based electrochromic material containing polythiophene, polyaniline, and polypyrrole, or a derivative thereof. Specifically, the electrochromic material may be any one selected from the group consisting of polythiophene, polyaniline, polypyrrole, polyanthracene, polyfluorene, polycarbazole, polyphenylenevinylene, and a derivative thereof.

At this time, the electrochromic material may be in a liquid or solid form. When the electrochromic material is in a solid form, as illustrated in FIGS. 4 to 7, the electrochromic layer 160 may include an electrolyte layer 162, and an electrochromic coating layer 161 formed on one surface or both surfaces of the electrolyte layer 162.

Figure 4:
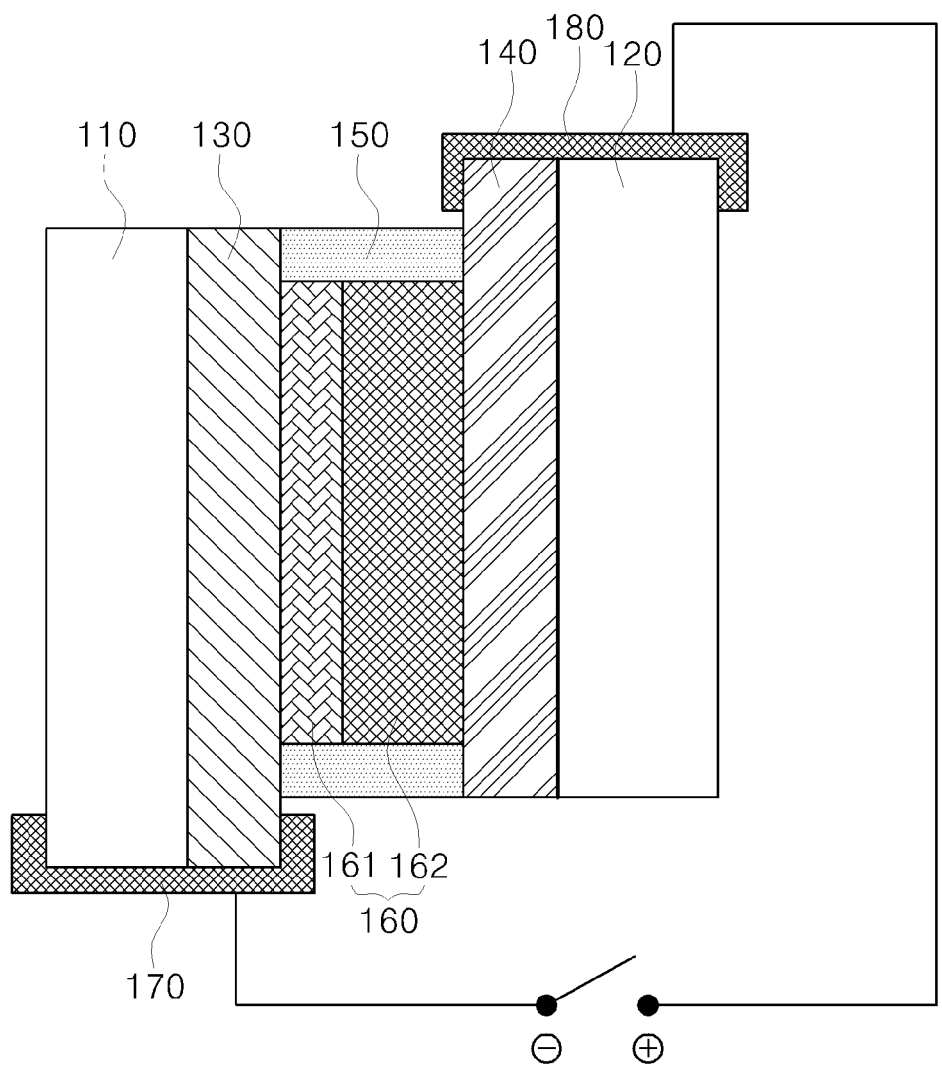
Figure 5:
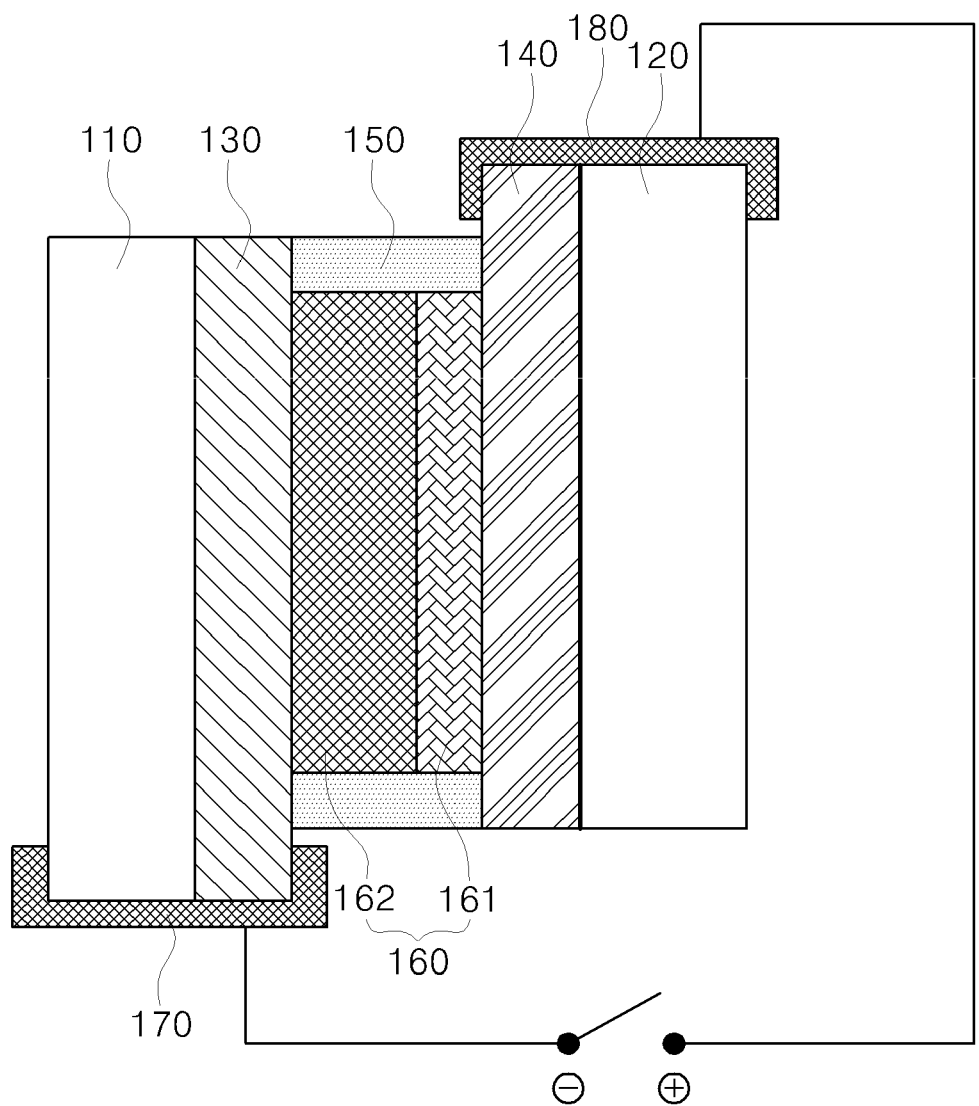
Figure 6:
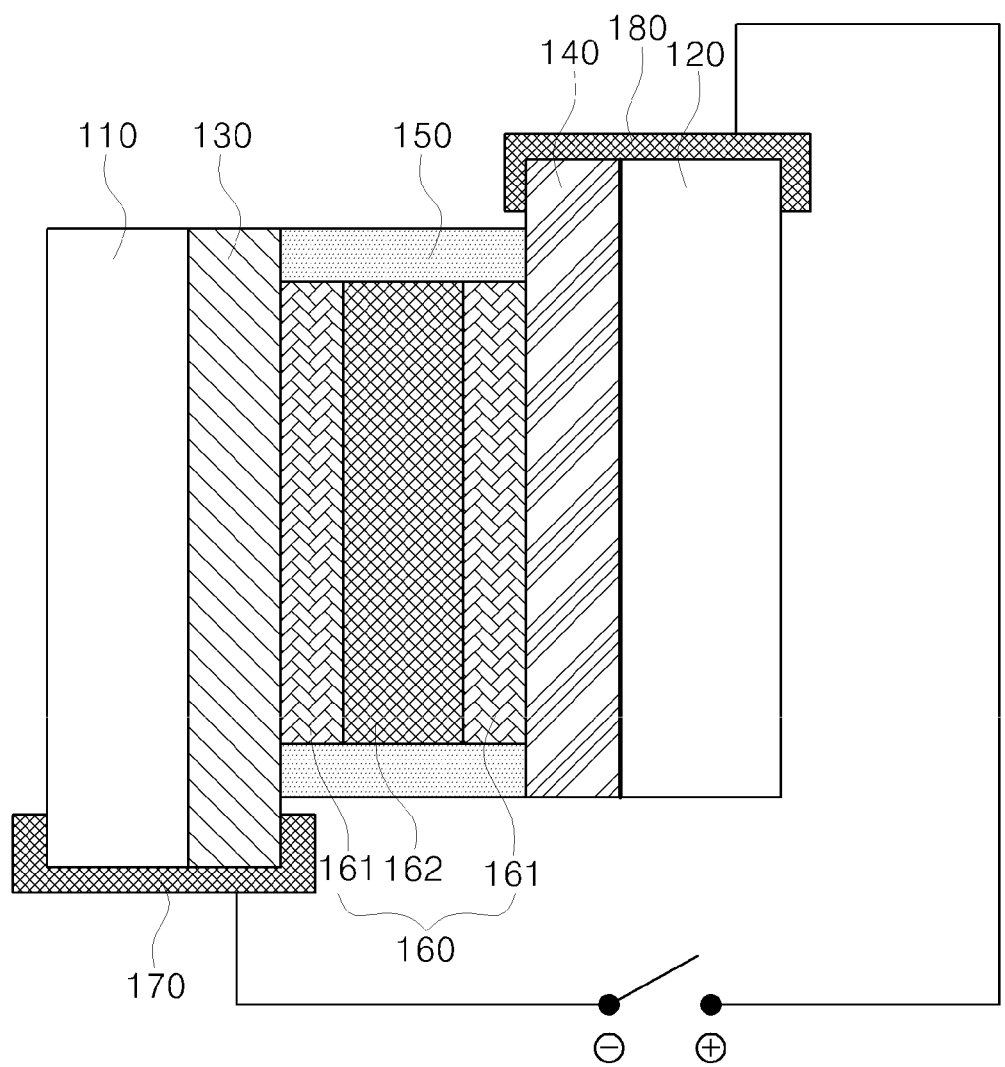
Figure 7:
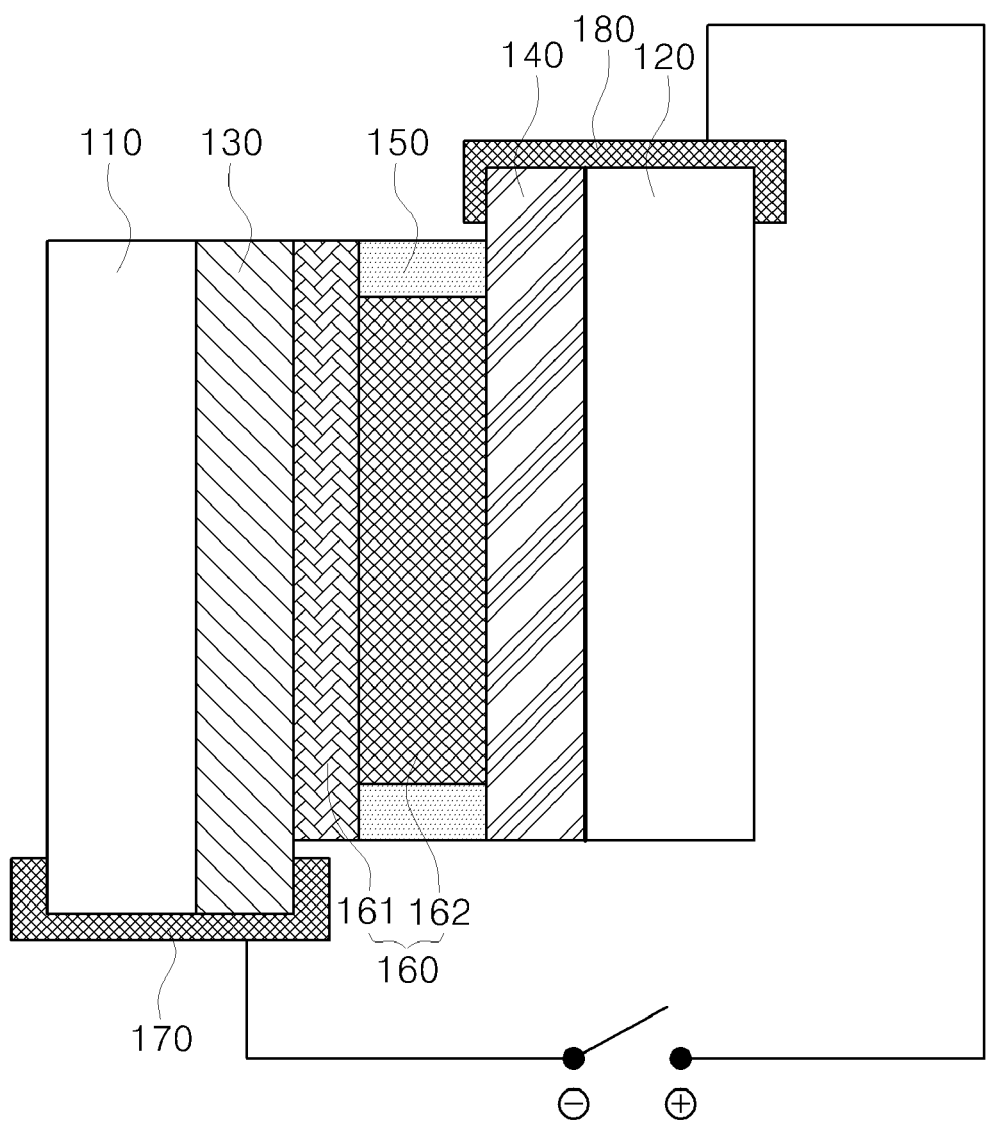

That is, as illustrated in FIGS. 4 and 7, the electrochromic coating layer 161 may be formed between the electrolyte layer 162 and the transparent electrode 130, or as illustrated in FIG. 5, the electrochromic coating layer 161 may be formed between the electrolyte layer 162 and the conductive reflection layer 140, or as illustrated in FIG. 6, the electrochromic coating layer 161 may be formed on both surfaces of the electrolyte layer 162. At this time, as illustrated in FIGS. 3 to 5, the sealing part 150 may be formed at a side portion of the electrochromic coating layer 161, and as illustrated in FIG. 7, the sealing part 150 may be formed at an upper portion of one end of the electrochromic coating layer 161.

When the electrochromic material is in a liquid form, uniform discoloration is not implemented, and a voltage should be continuously applied in order to maintain a discoloration state, so high power consumption is generated. On the contrary, as described above, when the electrochromic coating layer 161 is formed in a solid form, uniform discoloration and decolorization can be implemented. Furthermore, since the electrochromic material has a memory effect, a voltage can be only applied upon discoloration and decolorization, so low power consumption can be realized, and since a back voltage is applied upon decolorization, a rapid decolorization speed can be realized. Also, since the electrochromic material applied to the coating method is an inorganic or organic polymer, durability of the device can be improved.

Figure 8:
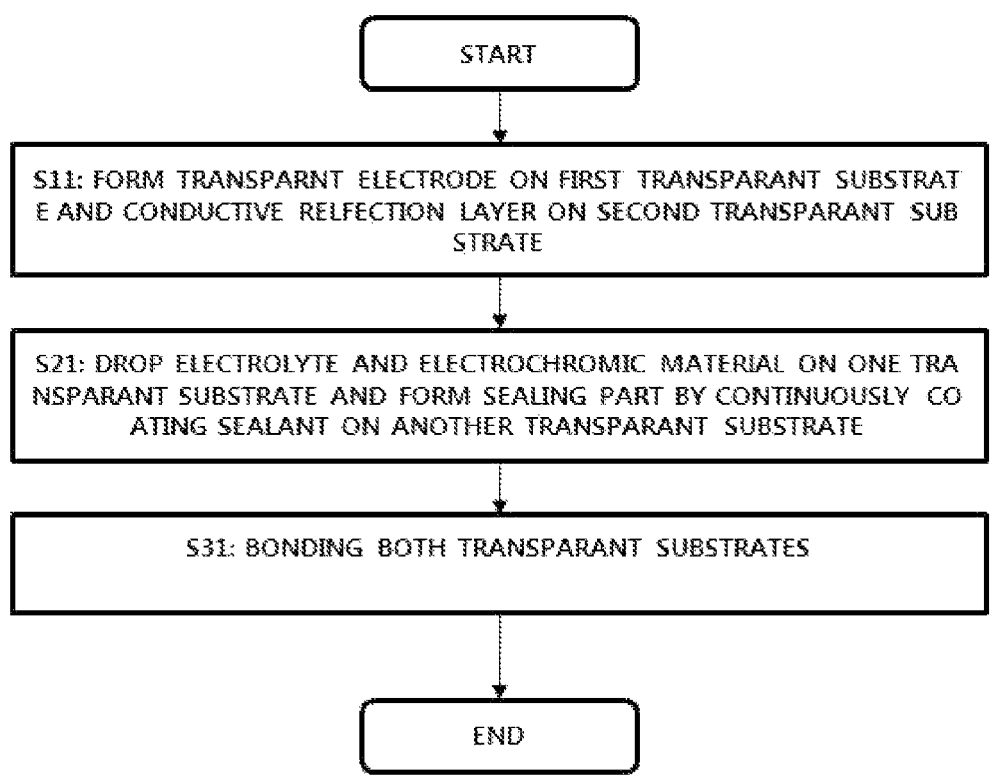
FIGS. 8 and 9 are a flow chart and a process view illustrating a method of manufacturing the electrochromic display device according to the present invention.
Figure 9:
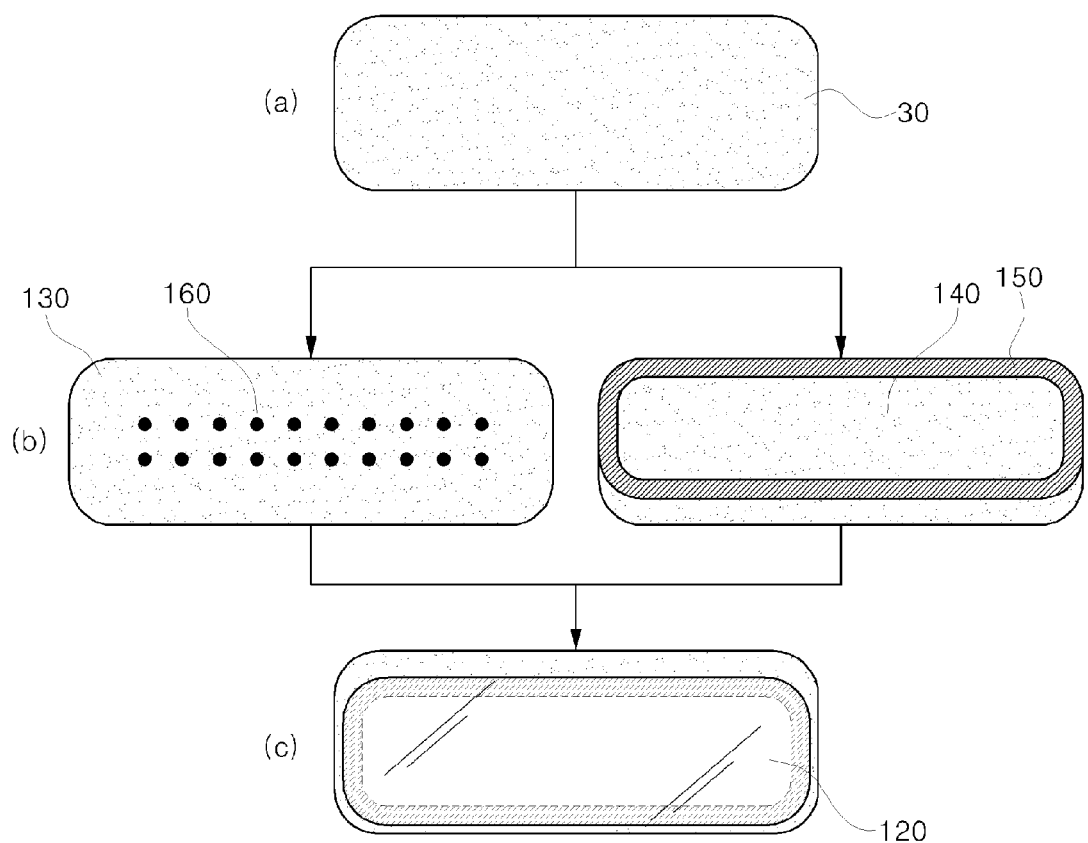

FIG. 8 is a flow chart illustrating a method of manufacturing the electrochromic display device according to the present invention, and FIG. 9 is a process view illustrating the method of manufacturing the electrochromic display device according to the present invention. The description of the constitutive elements previously described through FIGS. 3 to 7 is omitted, and the manufacturing process will be described.

Referring to FIGS. 8 and 9, the transparent electrode is formed on the first transparent substrate, and the conductive reflection layer is formed on the second transparent substrate (S11 of (A) of FIG. 9). At this time, even though it is not illustrated, the electrochromic coating layer is formed by coating any one or all of a transparent substrate or a conductive reflection layer using a deep coating method, a spray coating method or a spin coating method. Through FIGS. 8 and 9, even though a method of dropping a liquid electrochromic material and electrolyte material without formation of the electrochromic coating layer is described, it is obvious to those having ordinary skill in the art that a dropped material, which will be described later, may be an electrolyte, and the electrolyte may be dropped on the electrochromic coating layer.

Then, a liquid electrolyte and the electrochromic material 160 is dropped on any one transparent substrate of the first transparent substrate on which the transparent electrode 130 is formed, and the second transparent substrate 120 on which the conductive reflection layer 140 is formed, more specifically, on any one of the transparent electrode and the conductive reflection layer 140. Furthermore, the sealing part 150 is formed by coating a sealant on another transparent substrate, namely, by coating a sealant on an upper end of a facing surface of the transparent electrode or the conductive reflection layer in a continuous ring-like shape in a vacuum state or an atmospheric condition without an injection hole, the upper end not being dropped with the liquid material (S21, (B) of FIG. 9). FIG. 9 illustrates an example in which the liquid material 160 is dropped on the transparent electrode 130, and the sealing part 150 is formed on the conductive reflection layer 140.

More specifically, only side sealing is performed by coating the sealant on an upper portion of the conductive reflection layer 140, and additional end sealing is not required by forming a continuous sealing part. That is, in the conventional vacuum injection method, in order to inject a liquid electrolyte and electrochromic material in a vacuum state, an injection hole must be formed upon side sealing. Accordingly, a side sealing portion is not continuously formed, and a spaced portion is generated due to the injection hole. After this, even though the injection hole is sealed by end sealing, the sealing part itself is not continuously formed, and a discontinuous portion resulting from the end sealing is generated.

In particular, as the electrochromic display device becomes bigger, the conventional vacuum injection method is problematic in that a time required for injecting a material is increased, so production efficiency of the product is reduced, production costs is also increased (for example, it takes more than 10 hours to inject one kind of a material based on 42").

On the contrary, according to the dropping method of the present invention, a process time (within several minutes to dozens of minutes) can be reduced regardless of a product size, so production efficiency can be increased, and a product cost can be also reduced.

After this, when the electrochromic display device is manufactured by bonding the two transparent substrates (S31 of (C) of FIG. 9), a process for forming the electrode connection part at one end of the first transparent substrate and the transparent electrode, and at one end of the second transparent substrate and the conductive reflection layer may be further added.

The embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. An electrochromic display device, comprising:
   a first substrate and a second substrate that face each other;
   an electrochromic layer provided between the first substrate and the second substrate;
   a sealing part provided between the first substrate and the second substrate to seal the electrochromic layer;
   a transparent electrode formed between the first substrate and the electrochromic layer; and
   a conductive reflection layer formed between the electrochromic layer and the second substrate,
   wherein the electrochromic layer includes:
      an electrolyte layer containing a liquid electrolyte; and
      an electrochromic coating layer in a solid form which comes into contact with the electrolyte layer,
   wherein the sealing part is provided on the conductive reflection layer, has a ring structure having a vacant inner portion, and comes into contact with the conductive reflection layer and the transparent electrode, and
   wherein the electrochromic coating layer is received in an inner side of the sealing part and comes into contact with the conductive reflection layer.

2. The electrochromic display device of claim 1, wherein the electrochromic layer contains the liquid electrolyte and a liquid electrochromic material.

3. The electrochromic display device of claim 1, wherein the electrochromic coating layer is received in an inner side of the sealing part, and comes into contact with the transparent electrode.

4. The electrochromic display device of claim 1, wherein the conductive reflection layer is composed of at least one metal selected from the group consisting of Cu, Au, Ag, Ni, Al, Cr, Ru, Re, Pb, Sn, In, and Zn, or an alloy containing these metals.

5. The electrochromic display device of claim 1, wherein the electrochromic material is a metal oxide-based electrochromic material containing tungsten, iridium, nickel, and vanadium; an organic electrochromic material containing viologen quinone; a conductive polymer-based electrochromic material containing polythiophene, polyaniline, and polypyrrole; or a derivative thereof.

6. The electrochromic display device of claim 1, wherein the electrochromic coating layer contains any one selected from the group consisting of polythiophene, polyaniline, polypyrrole, polyanthracene, polyfluorene, polycarbazole, polyphenylenevinylene, and a derivative thereof.

7. The electrochromic display device of claim 1, wherein the first substrate and the second substrate are transparent substrates.

8. The electrochromic display device of claim 7, wherein the first substrate and the second substrate are made of any one material selected from among glass, silicone, synthetic resin, and aerogel.

9. The electrochromic display device of claim 1, wherein the transparent electrode is made of any one selected from the group consisting of ITO (Indium Tin Oxide), FTO (Fluor doped Tin Oxide), AZO (Aluminum doped Zinc Oxide), GZO (Gallium doped Zinc Oxide), ATO (Antimony doped Tin Oxide), IZO (Indium doped Zinc Oxide), NTO (Niobium doped Titanium Oxide), ZnO, and a combination thereof.

10. The electrochromic display device of claim 9, wherein at least any one of the first substrate and the second substrate is a non-transparent substrate.

11. An electrochromic display device, comprising:
a first substrate and a second substrate that face each other;
an electrochromic layer provided between the first substrate and the second substrate;
a sealing part provided between the first substrate and the second substrate to seal the electrochromic layer;
a transparent electrode provided between the first substrate and the electrochromic layer; and
a conductive reflection layer provided between the electrochromic layer and the second substrate,
wherein the electrochromic layer includes:
an electrolyte layer including a liquid electrolyte; and
an electrochromic coating layer in a solid form which comes into contact with the electrolyte layer,
wherein the sealing part is provided on the conductive reflection layer, has a ring structure having a vacant inner portion, and comes into contact with the conductive reflection layer and the transparent electrode,
wherein the electrochromic coating layers are provided on both surfaces of the electrolyte layer, and
wherein one of the electrochromic coating layers comes into contact with the transparent electrode, and another comes into contact with the conductive reflection layer.

* * * * *